(12) United States Patent
Force et al.

(10) Patent No.: US 8,876,942 B2
(45) Date of Patent: Nov. 4, 2014

(54) SYSTEMS AND METHODS FOR REMOVING ENTRAINED PARTICULATES FROM GAS STREAMS, AND REACTOR SYSTEMS

(75) Inventors: Randall L. Force, Charleston, WV (US); William J. Blickley, Scott Depot, WV (US); Edward A. Leach, St. Albans, WV (US); Robert O. Hagerty, Wyckoff, NJ (US)

(73) Assignee: Univation Technologies, LLC, Houston, TX (US)

( * ) Notice: Subject to any disclaimer, the term of this patent is extended or adjusted under 35 U.S.C. 154(b) by 663 days.

(21) Appl. No.: 12/810,333

(22) PCT Filed: Dec. 10, 2008

(86) PCT No.: PCT/US2008/013559
§ 371 (c)(1),
(2), (4) Date: Jun. 24, 2010

(87) PCT Pub. No.: WO2009/085109
PCT Pub. Date: Jul. 9, 2009

(65) Prior Publication Data
US 2010/0282075 A1   Nov. 11, 2010

Related U.S. Application Data

(60) Provisional application No. 61/009,308, filed on Dec. 27, 2007.

(51) Int. Cl.
| | | |
|---|---|---|
| *B01D 53/00* | (2006.01) | |
| *B01D 45/12* | (2006.01) | |
| *B01J 8/18* | (2006.01) | |
| *B01D 45/14* | (2006.01) | |
| *B01J 8/38* | (2006.01) | |
| *C08F 10/00* | (2006.01) | |
| *B01J 8/00* | (2006.01) | |

(52) U.S. Cl.
CPC ............. *B01J 8/005* (2013.01); *B01D 45/12* (2013.01); *B01J 8/1818* (2013.01); *B01J 8/1809* (2013.01); *B01D 45/14* (2013.01); *B01J 8/388* (2013.01); *B01J 8/1863* (2013.01); *B01J 8/1827* (2013.01); *C08F 10/00* (2013.01); *B01J 8/0055* (2013.01); *B01J 2219/00252* (2013.01); *B01J 2208/00176* (2013.01); *B01J 8/1872* (2013.01); *B01J 2208/00176* (2013.01)
USPC ............... 95/39; 95/267; 526/68; 526/88

(58) Field of Classification Search
USPC ............... 95/39, 267; 526/68, 88; 422/138
See application file for complete search history.

(56) References Cited

U.S. PATENT DOCUMENTS

| | | | |
|---|---|---|---|
| RE20,543 E | 11/1937 | Crites | |
| 2,187,627 A | 1/1940 | Gustav | |
| 2,201,301 A | 5/1940 | Alan | |
| 2,847,087 A | 8/1958 | Cunningham | |

(Continued)

FOREIGN PATENT DOCUMENTS

| | | |
|---|---|---|
| WO | WO 2005/014659 | 2/2005 |
| WO | WO 2005/084778 | 9/2005 |
| WO | WO 2006/050907 | 5/2006 |

*Primary Examiner* — Robert A Hopkins

(57) ABSTRACT

Various methods and systems for removing particulates from a cycle gas stream, e.g., in a reactor system, are provided. In certain embodiments, the methods are performed in conjunction with a polymerization reactor system such as a gas-phase reactor system.

12 Claims, 6 Drawing Sheets

(56) References Cited

U.S. PATENT DOCUMENTS

| | | |
|---|---|---|
| 3,493,553 A | 2/1970 | Hinton |
| 3,922,322 A | 11/1975 | Roger et al. |
| 4,077,135 A | 3/1978 | Tzschoppe et al. |
| 4,321,006 A | 3/1982 | von Ohain et al. |
| 4,592,765 A | 6/1986 | Breitman et al. |
| 4,695,220 A | 9/1987 | Dawson |
| 4,695,225 A | 9/1987 | Hellat et al. |
| 4,806,073 A | 2/1989 | Schonwald |
| 4,882,400 A | 11/1989 | Dumain et al. |
| 5,034,195 A | 7/1991 | Platz |
| 5,041,473 A | 8/1991 | Gau et al. |
| 5,143,705 A | 9/1992 | Platz |
| 5,186,607 A | 2/1993 | Yang et al. |
| 5,352,749 A | 10/1994 | DeChellis et al. |
| 5,378,434 A | 1/1995 | Staffin et al. |
| 5,382,638 A | 1/1995 | Bontemps et al. |
| 5,505,906 A | 4/1996 | Engstrom et al. |
| 5,510,017 A | 4/1996 | Abdullayev |
| 5,601,788 A | 2/1997 | Hyppanen et al. |
| 5,616,661 A | 4/1997 | Eisinger et al. |
| 5,733,510 A | 3/1998 | Chinh et al. |
| 5,857,833 A | 1/1999 | Dev |
| 5,922,818 A | 7/1999 | Morterol |
| 5,942,194 A | 8/1999 | Hummel et al. |
| 6,187,878 B1 | 2/2001 | Lalanne et al. |
| 6,218,484 B1 | 4/2001 | Brown et al. |
| 6,225,422 B1 | 5/2001 | Power et al. |
| 6,306,981 B1 | 10/2001 | Brown et al. |
| 6,350,054 B1 | 2/2002 | Lee et al. |
| 6,413,477 B1 | 7/2002 | Govoni et al. |
| 6,472,482 B1 | 10/2002 | Evertz et al. |
| 6,689,845 B1 | 2/2004 | Govoni et al. |
| 6,818,187 B2 | 11/2004 | Govoni et al. |
| 6,837,912 B1 | 1/2005 | Heumann |
| 6,911,504 B2 | 6/2005 | Reiling |
| 7,004,998 B2 | 2/2006 | Scherrer |
| 7,070,637 B1 | 7/2006 | Zhang |
| 7,116,414 B2 | 10/2006 | Long |
| 8,063,158 B2 * | 11/2011 | Dooley et al. .......... 526/64 |
| 2001/0048877 A1 | 12/2001 | Illingworth et al. |
| 2002/0061264 A1 | 5/2002 | Govoni et al. |
| 2002/0065375 A1 | 5/2002 | Yamamoto et al. |
| 2003/0162914 A1 | 8/2003 | Reiling |
| 2004/0072971 A1 | 4/2004 | Govoni et al. |
| 2004/0254308 A1 | 12/2004 | Schurzky et al. |
| 2005/0056150 A1 | 3/2005 | Scherrer |
| 2005/0126394 A1 | 6/2005 | Reiling |
| 2005/0267267 A1 | 12/2005 | Sandell et al. |
| 2005/0272891 A1 | 12/2005 | Fouarge et al. |
| 2007/0060724 A1 | 3/2007 | Ker et al. |

* cited by examiner

US 8,876,942 B2

SYSTEMS AND METHODS FOR REMOVING ENTRAINED PARTICULATES FROM GAS STREAMS, AND REACTOR SYSTEMS

CROSS REFERENCE TO RELATED APPLICATIONS

This application is a National Stage entry under 36 U.S.C. 371 of International Application No. PCT/US2008/013559, filed Dec. 10, 2008, and claims the benefit of Ser. No. 61/009,308, filed Dec. 27, 2007, the disclosure of which is incorporated by reference.

FIELD OF THE INVENTION

The present invention generally relates to solid/gas separations, and more particularly, this invention relates to systems and methods for removing particulates from a gas stream in a reactor system.

BACKGROUND

In the gas phase process for the production of polyolefin polymers such as polyethylene polymers, one or more gaseous alkenes (e.g., ethylene, butene, propene, etc.), hydrogen, co-monomer and other materials produce a solid polyolefin product. Generally, gas phase polymerization systems typically include a fluidized bed reactor, a compressor, and a cooler. The reaction is maintained in a two-phase fluidized bed of granular polyethylene polymers and gaseous reactants by the fluidizing gas which is passed through a distributor plate near the bottom of the reactor vessel. The reactor vessel is normally constructed of carbon steel and rated for operation at pressures, for example, up to about 50 bars (or about 3.1 MPa). Catalyst is injected into the fluidized bed. Heat of reaction is transferred to the circulating gas stream. This gas stream is compressed and cooled in the external cycle line and then is reintroduced into the bottom of the reactor where it passes through a distributor plate. Make-up feedstreams and optionally other materials are added to maintain the desired reactant concentrations.

While the reactor's internal disengagement section removes a substantial amount of particles, it is typical for small particulates of catalyst and polymer product to become entrained in the cycle gas stream. Commonly in processes in which a portion of the remaining entrained particulates are removed from the cycle gas stream, the particulates are removed after the outlet of the reactor and before the cycle gas reaches the compressor e.g., typically using one or more cyclones. See, for example, U.S. Pat. Nos. 5,922,818, and 6,911,504.

SUMMARY

The present invention is broadly directed to various methods and systems for removing particulates from a gas stream, e.g., a cycle gas stream, in a reactor system. In certain embodiments, the methods are performed in conjunction with a polymerization reactor system such as, for example, gas-phase reactor system. The invention is also broadly directed to various systems for effecting the separation.

In a class of embodiments, a method for separating particulates from a gas stream in a reactor system according to one embodiment comprises compressing a gas stream having particulates entrained therein; and removing at least some of the particulates from the compressed gas stream.

In another class of embodiments, a method for separating particulates from a gas stream in a fluidized bed reactor system according to one embodiment comprises compressing a cycle gas stream coming from a reactor vessel, the cycle gas stream having particulates entrained therein; using a concentrator to concentrate at least some of the particulates in the compressed cycle gas stream in a second gas stream, the second gas stream comprising gas diverted from the compressed cycle gas stream; and directing the second gas stream into the reactor vessel.

In yet another class of embodiments, a reactor system according to one embodiment comprises at least one reactor vessel; a cycle line for cycling gas removed from the at least one reactor vessel back to the at least one reactor vessel; a compressor for compressing the gas in the cycle line; and a separation device for removing particulates from the compressed gas.

Additionally, in a class of embodiments, an axial compressor according to one embodiment comprises an outer shell having an inlet, a gas outlet, and a solids outlet; a plurality of arrays of stator blades extending inwardly from an inner surface of the outer shell; an inner member positioned in the outer shell and rotatably mounted relative thereto; and a plurality of radial arrays of rotor blades extending outwardly from the inner member, wherein a relative rotation between the inner member and the outer shell urges the gas towards the gas outlet, wherein a relative rotation between the inner member and the outer shell causes a cyclonic separation of solid particulates from a bulk of the gas, the separated particles exiting the solids outlet, a majority of the gas exiting the gas outlet.

In another class of embodiments, an axial compressor according to one embodiment comprises an outer shell having a first end, a second end opposite the first end, an axis extending through the ends, an inlet positioned towards the first end, a gas outlet positioned towards the second end, a solids outlet, an inner surface, and a plurality of arrays of stator blades extending inwardly from the inner surface, a first of the arrays of stator blades being located near the inlet, additional of the arrays being present in spaced relation relative to each other; an inner member positioned in the outer shell and rotatably mounted thereto, the inner member having a plurality of radial arrays of rotor blades extending outwardly therefrom, wherein rotation of the inner member relative to the outer shell compresses gas entering the inlet and exiting the outlets by action of the arrays of stator blades converting a portion of a gas velocity head generated by the arrays of rotor blades into a pressure head operable to deliver the gas to a downstream array of rotor blades; and a barrier extending inwardly from the second end of the outer shell, the barrier separating the gas outlet and the solids outlet, wherein a relative rotation between the inner member and the outer shell causes a cyclonic separation of solid particulates from a bulk of the gas, the barrier directing the separated solids towards the solids outlet and a majority of the gas towards the gas outlet.

In yet another class of embodiments, a method according to one embodiment comprises detecting an amount of solids in a gas stream; decreasing an angle of a guide vane of a concentrator relative to a direction of entry of the gas into the concentrator if the detected amount of solids in the gas stream decreases; increasing an angle of a guide vane of a concentrator relative to a direction of entry of the gas into the concentrator if the detected amount of solids in the gas stream increases.

Additionally, in a class of embodiments, a system according to one embodiment comprises a concentrator, further comprising: a shell having an inlet, a gas outlet, and a solids outlet; at least one guide vane positioned near the inlet for prespinning a gas entering the shell, an amount of solids separated from the gas being a function of an angle of the at least one guide vane relative to a direction of entry of the gas into the inlet; and a detection device for detecting an amount of solids in the gas, wherein the angle of the at least one guide vane is adjusted based on a reading from the detection device.

In another class of embodiments, a reactor system according to one embodiment comprises at least one reactor vessel; a cycle line for cycling gas removed from the at least one reactor vessel back to the at least one reactor vessel; a concentrator coupled to the cycle line, the concentrator further comprising: a shell having an inlet, a gas outlet, and a solids outlet; at least one guide vane positioned near the inlet for prespinning a gas entering the shell, an amount of solids separated from the gas being a function of an angle of the at least one guide vane relative to a direction of entry of the gas into the inlet; and a detection device for detecting an amount of solids in the gas, wherein the angle of the at least one guide vane is adjusted based on a reading from the detection device.

DETAILED DESCRIPTION

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Figure 1:
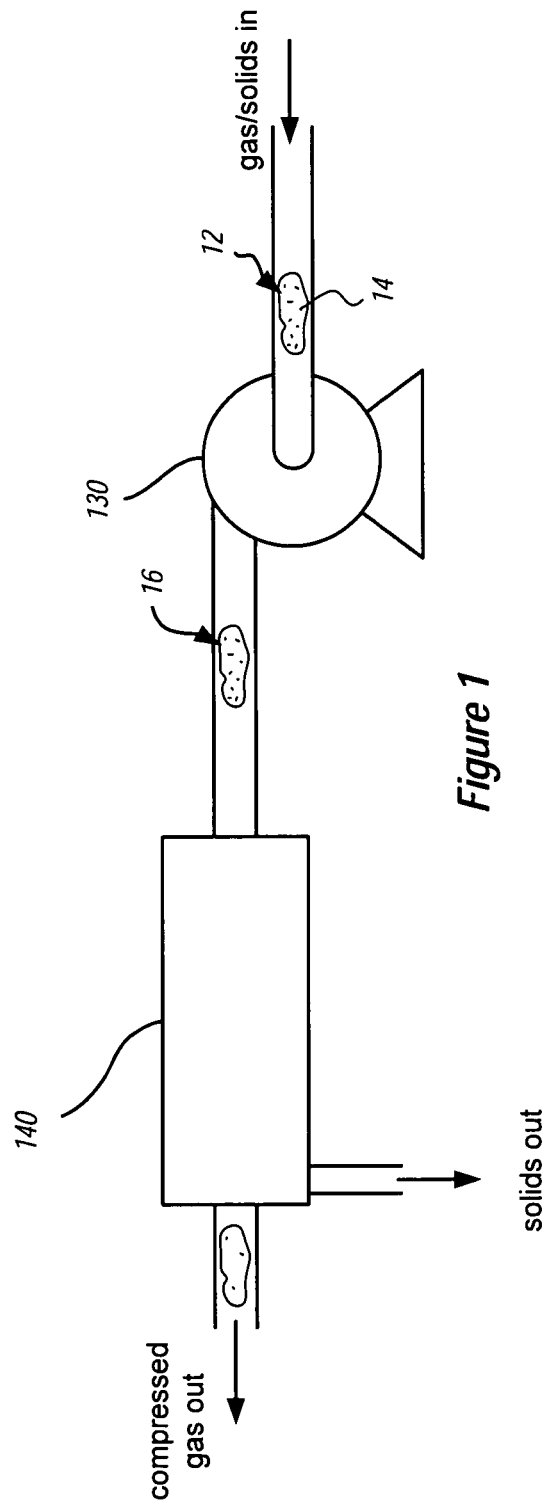
FIG. 1 is a schematic representation of the general methods, systems and/or apparatuses of certain embodiments of the invention.

A general method of the invention may be described, for example, with reference to FIG. 1, in which a gas stream 12 having particulates 14 entrained therein is compressed, e.g., using a compressor 130. Such gas stream can also include liquid as well as solid material. As used herein "particulate(s)" generally refers to solid or liquid matter that is dispersed in a gas, or insoluble solid matter dispersed in a liquid and/or gas environment, that gives a heterogeneous mixture or composition. At least some of the particulates 14 are removed from the compressed gas stream 16, e.g., using a solids separation device 140. Further details of solids separation devices including specific apparatus adapted for such solids separation are described below, and each of the below-described details are specifically considered combinable in various combination with these and other generally preferred approaches described herein.

Figure 2:
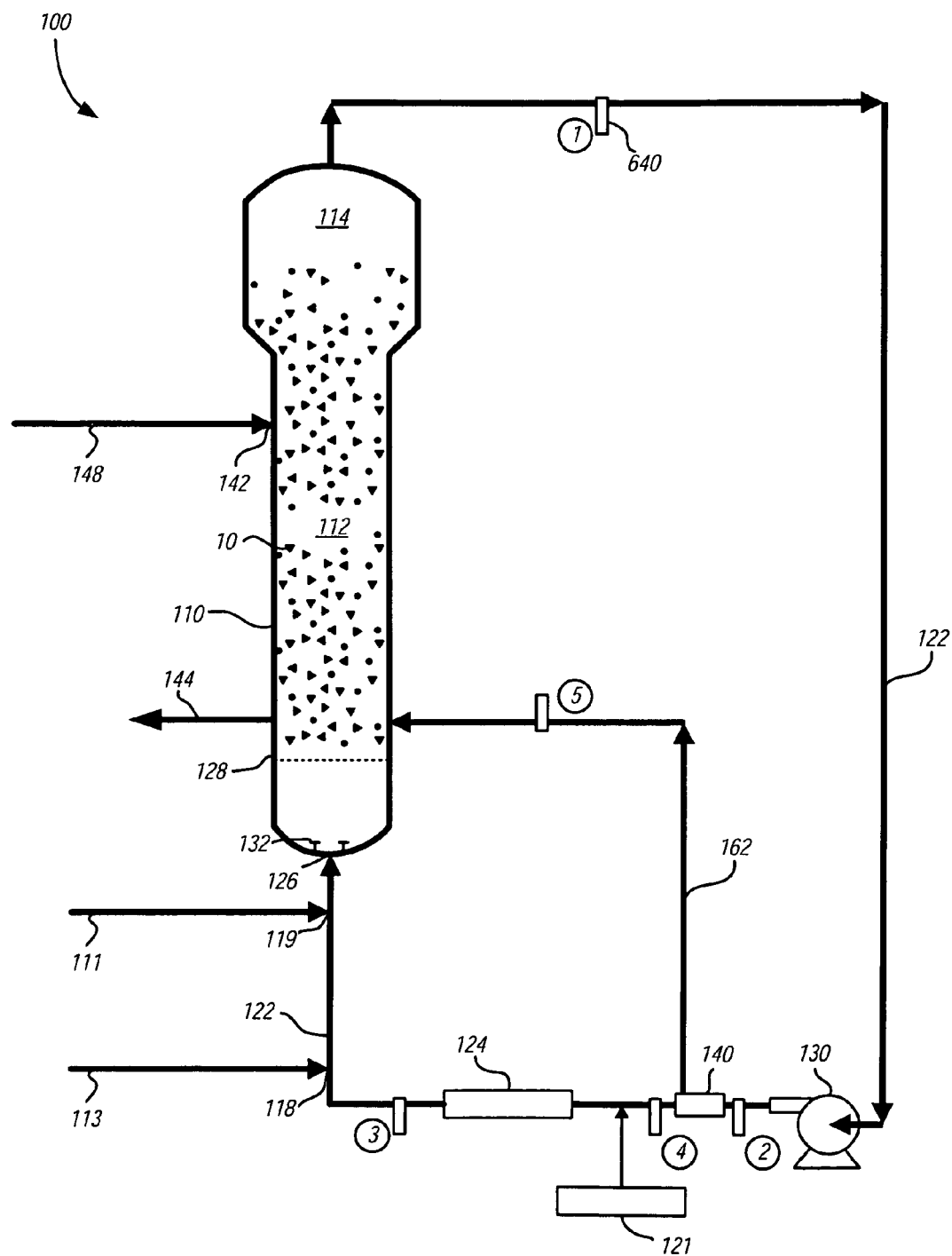
FIG. 2 is a schematic representation of the general methods, systems and/or apparatuses of certain embodiments of the invention illustrating implementation in a fluidized bed polymerization reactor system.
Figure 3:
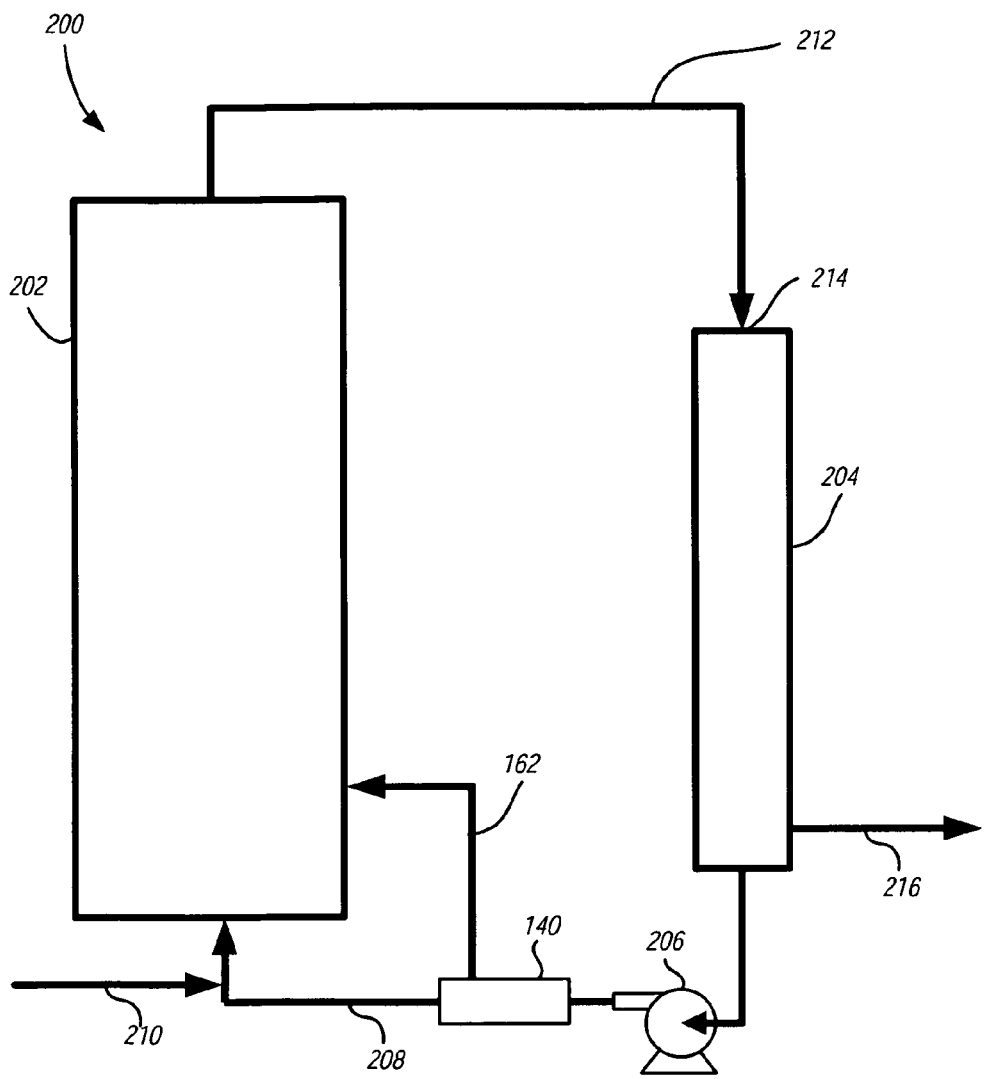
FIG. 3 is a schematic representation of the general methods, systems and/or apparatuses of certain embodiments of the invention illustrating implementation in a fluidized bed polymerization reactor system.
Figure 4:
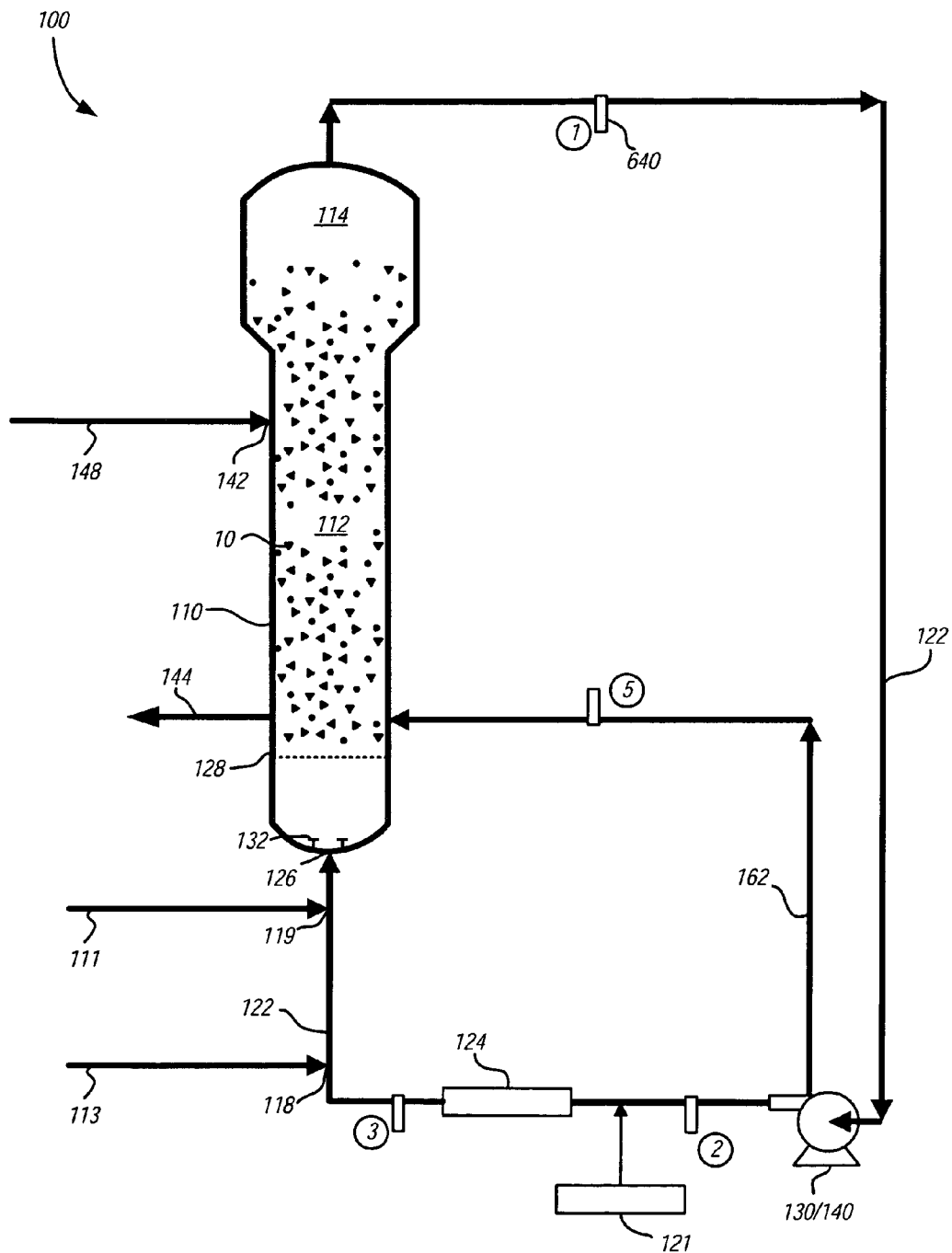
FIG. 4 is a schematic representation of the general methods, systems and/or apparatuses of certain embodiments of the invention illustrating implementation in a fluidized bed polymerization reactor system.
Figure 5:
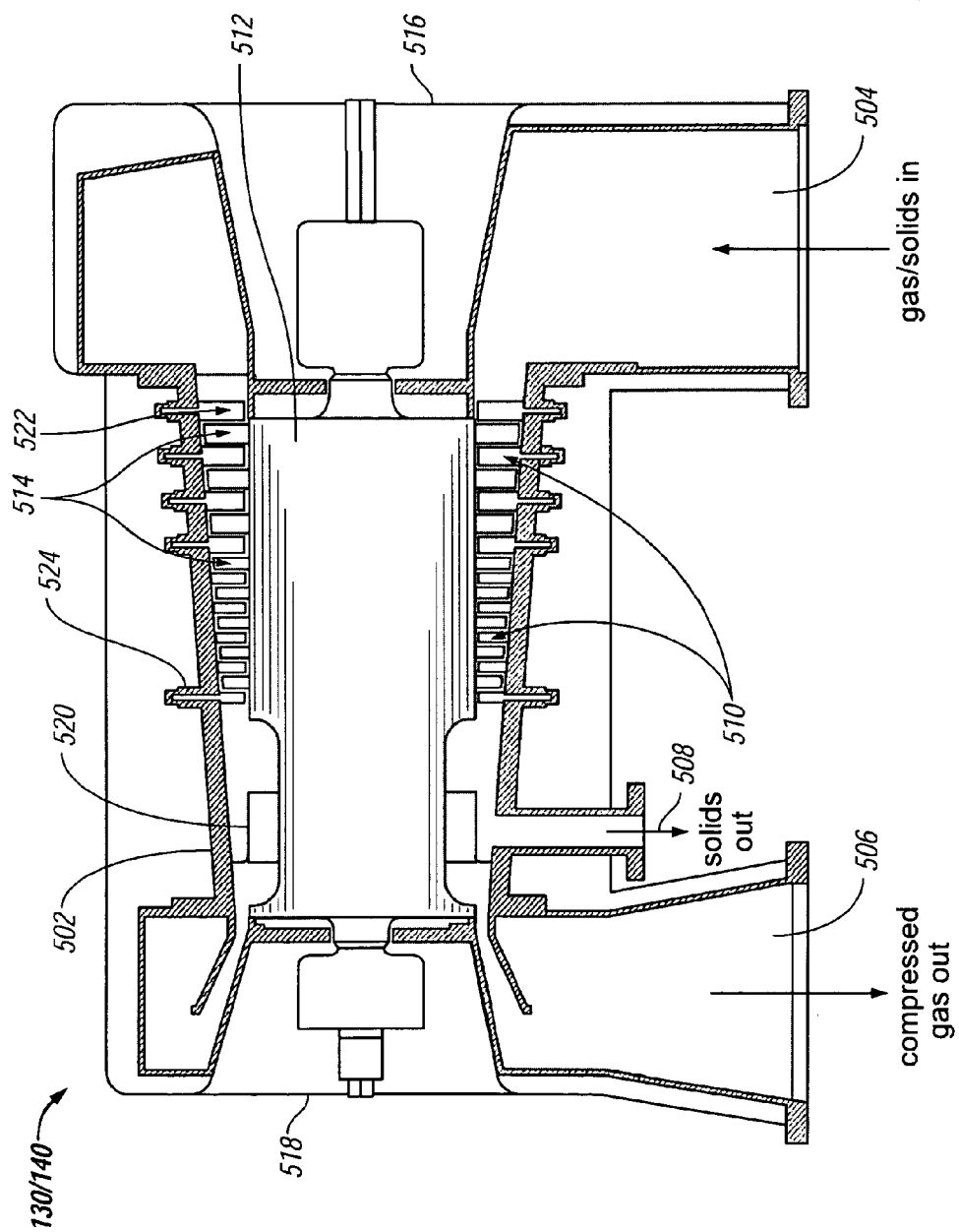
FIG. 5 is a schematic representation of an apparatus of an embodiment of the invention.

In a further generally preferred approach of the general method, with reference to FIGS. 2, 4 and 5, a cycle gas stream, e.g., in cycle line 122 coming from a reactor vessel 110 is compressed, the cycle gas stream having particulates entrained therein. A concentrator 140 is used to concentrate at least some of the particulates in the compressed cycle gas stream in a second gas stream 162, the second gas stream 162 comprising gas diverted from the compressed cycle gas stream. The second gas stream is directed into the reactor vessel 110. This second gas stream with the concentration of particulates could also be directed to downstream equipment e.g., the product discharge system, the resin purging system, or other appropriate location. Further details of fluidized bed polymerization reactor systems and concentrators including specific apparatus adapted for such solids separation are described below, and each of the below-described details are specifically considered combinable in various combination with these and other generally preferred approaches described herein.

In a further general approach of a general method, with reference to FIGS. 1, 2, 4 and 6, an amount of solids in a gas stream is detected. An angle of a guide vane of a concentrator 140 relative to a direction of entry of the gas into the concentrator 140 is adjusted if the detected amount of solids in the gas stream decreases. This may include changing the blade or vane angle of a single guide vane, changing the blade or vane angle of a single row (set) of guide vanes, or changing the blade or vane angle of multiple rows (sets) of guide vanes. An angle of a guide vane of the concentrator 140 relative to the direction of entry of the gas into the concentrator 140 is increased if the detected amount of solids in the gas stream increases.

Further details of concentrators including specific apparatus adapted for such solids separation are described below, and each of the below-described details are specifically considered combinable in various combination with these and other generally preferred approaches described herein.

The present invention also includes devices and systems effective for effecting solids removal according to the aforementioned methods.

A general reactor system, which may be described for example, with reference to FIG. 2, includes at least one reactor vessel 110, a cycle line 122 for cycling gas removed from the at least one reactor vessel back to the at least one reactor vessel or downstream equipment e.g., the product discharge system, the resin purging system, or other appropriate location, and a compressor 130 for compressing the gas in the cycle line. A separation device 140 removes at least some of the particulates from the compressed gas in the cycle line 122.

In another general reactor system, which may be described for example with reference to FIG. 4, the system includes at least one reactor vessel 110, a cycle line 122 for cycling gas removed from the at least one reactor vessel back to the at least one reactor vessel, and a compressor 130 for compressing the gas in the cycle line as well as removing at least some of the particulates from the compressed gas in the cycle line 122.

In another general embodiment, which may be described for example with reference to FIGS. 4 and 5, an axial compressor 130 performs solids separation. Such axial compressor may be the sole compressor in a given system, or may be present in addition to another compressor. The axial compressor 130 includes an outer shell 502 having an inlet 504, a gas outlet 506, and a solids outlet 508. A plurality of arrays of stator blades 510 extend inwardly from an inner surface of the outer shell 502. An inner member 512 is positioned in the outer shell and rotatably mounted relative thereto. A plurality of radial arrays of rotor blades 514 extending outwardly from the inner member 512. A relative rotation between the inner member 512 and the outer shell 502 urges the gas towards the gas outlet. A relative rotation of the inner member 512 and the outer shell 502 also causes a cyclonic separation of solid particulates from a bulk of the gas, the separated particles exiting the solids outlet 508, a majority of the gas exiting the gas outlet 506.

In yet another general embodiment, which may be described for example with reference to FIG. 5, an axial compressor 130 includes an outer shell 502 having a first end 516, a second end 518 opposite the first end 516, an axis extending through the ends, an inlet 504 positioned towards the first end 516, a gas outlet 506 positioned towards the second end 518, a solids outlet 508 positioned towards the second end 518, an inner surface, and a plurality of arrays of stator blades 510 extending inwardly from the inner surface, a first of the arrays of stator blades being located near the inlet 504, additional of the arrays being present in spaced relation relative to each other. The axial compressor 130 further includes an inner member 512 positioned in the outer shell 502 and is rotatably mounted relative thereto, the inner member 512 having a plurality of radial arrays of rotor blades 514 extending outwardly therefrom, where rotation of the inner member 512 relative to the outer shell 502 compresses gas entering the inlet 504 and exiting the outlets 506, 508 by action of the arrays of stator blades 510 converting a portion of a gas velocity head generated by the arrays of rotor blades 514 into a pressure head operable to deliver the gas to a downstream array of rotor blades 514. An additional array, or arrays, of adjustable vanes 524 can be situated near the end of the compression section to improve the swirl and thus the separation of particulate by cyclonic action. This adjustable array, or arrays of vanes 524, can be adjusted automatically or manually to optimize the balance between particulate separation and power consumption. A barrier 520 extends inwardly from the second end 518 of the outer shell 502, the barrier 520 separating the gas outlet 508 and the solids outlet 506, wherein a relative rotation between the inner member 512 and the outer shell 502 causes a cyclonic separation of solid particulates from a bulk of the gas, the barrier 520 directing the separated solids towards the solids outlet 508 and a majority of the gas towards the gas outlet 506.

Figure 6:
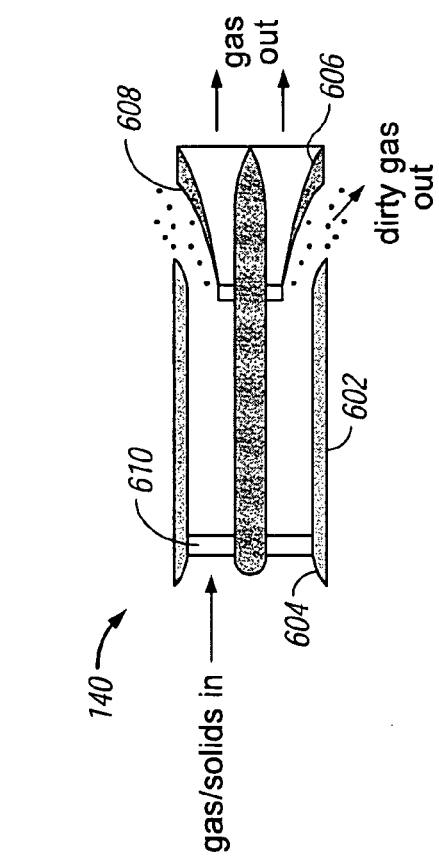
FIG. 6 is a schematic representation of an apparatus of an embodiment of the invention.

Another general embodiment, which may be described for example with reference to FIGS. 2 and 6, comprises a concentrator 140 and a detection device 640 (designated generally collectively using the reference numeral "640," with detection devices designated more specifically in the various figures as detection devices with circled numbers 1, 2, 3, etc. and in the associated text herein as 640-1, 640-2, 640-3, etc.) for detecting an amount of solids in a gas. The concentrator 140 includes a shell 602 having an inlet 604, a gas outlet 606, and a solids outlet 608. At least one guide vane 610 or guide vane array is positioned near the inlet 604 for prespinning a gas entering the shell 602, an amount of solids separated from the gas being a function of an angle of the at least one guide vane 610 relative to a direction of entry of the gas into the inlet 604. The angle of the at least one guide vane 610 is adjusted based on a reading from the detection device 640. As noted above, this adjustment may include changing the blade or vane angle of a single guide vane, changing the blade or vane angle of a single row (set) of guide vanes, or changing the blade or vane angle of multiple rows (sets) of guide vanes.

Another general embodiment, which may be described for example with reference to FIGS. 2 and 6, includes at least one reactor vessel 110, a cycle line 122 for cycling gas removed from the at least one reactor vessel 110 back to the at least one reactor vessel 110, and a concentrator 140 coupled to the cycle line 122. The concentrator 140 further comprises a shell 602 having an inlet 604, a gas outlet 606, and a solids outlet 608. At least one guide vane 610 is positioned near the inlet 604 for prespinning a gas entering the shell 602, an amount of solids separated from the gas being a function of an angle of the at least one guide vane 610 relative to a direction of entry of the gas into the inlet 604. At least one guide vane is positioned near the inlet for prespinning a gas entering the shell, an amount of solids separated from the gas being a function of an angle of the at least one guide vane relative to a direction of entry of the gas into the inlet. A detection device 640 detects an amount of solids in the gas. An angle of the at least one guide vane 610 is adjusted based on a reading from the detection device 640. Such adjustment may include changing the blade or vane angle of a single guide vane, changing the blade or vane angle of a single row (set) of guide vanes, or changing the blade or vane angle of multiple rows (sets) of guide vanes.

While the present invention is applicable to gas phase polyolefin production, the broad concepts and teachings herein also have applicability to many types of processes, including but not limited to, gas phase, gas/solid phase, liquid/solid phase, gas/liquid phase, and gas/liquid/solid phase reactor systems including polymerization reactor systems; gas phase, gas/solid phase, liquid/solid phase, gas/liquid phase, and gas/liquid/solid phase mass transfer systems; gas phase, gas/solid phase, liquid/solid phase, gas/liquid phase, and gas/liquid/solid phase mixing systems; gas phase, gas/solid phase, liquid/solid phase, gas/liquid phase, and gas/liquid/solid phase heating or cooling systems; gas/solid phase and gas/solid/liquid phase drying systems; etc.

For ease of understanding of the reader, as well as to place the various embodiments of the invention in a context, much of the following description shall be presented in terms of a commercial, gas phase polyethylene reactor system. It should be kept in mind that this is done by way of non-limiting example only.

Single- and Multi-Phase Systems

In each of the aforementioned generally preferred approaches and/or embodiments, the separations methods and devices may be used in conjunction with a variety of processes, including but not limited to, gas phase, gas/solid phase, liquid/solid phase, gas/liquid phase, and gas/liquid/ solid phase reactor systems including polymerization reactor systems; gas phase, gas/solid phase, liquid/solid phase, gas/ liquid phase, and gas/liquid/solid phase mass transfer systems; gas phase, gas/solid phase, liquid/solid phase, gas/liquid phase, and gas/liquid/solid phase mixing systems; gas phase, gas/solid phase, liquid/solid phase, gas/liquid phase, and gas/liquid/solid phase heating or cooling systems; gas/solid phase and gas/solid/liquid phase drying systems; etc.

Fluidized Bed Systems

A fluidized bed may generally include a bed of particles in which the static friction between the particles is disrupted. In each of the aforementioned generally preferred approaches and/or embodiments, the fluidized bed system can be an open fluidized bed system or a closed fluidized bed system. An open fluidized bed system can comprise one or more fluids and one or more types of fluidized solid particles and having one or more fluidized bed surfaces that are exposed to an open uncontrolled atmosphere. For example, an open fluidized bed system can be an open container such as an open-top tank or an open well of a batch reactor or of a parallel batch reactor (e.g., microtiter chamber). Alternatively, the fluidized bed system can be a closed fluidized bed system. A closed fluidized bed system can comprise one or more fluids and one or more types of fluidized particles that are generally bounded by a barrier so that the fluids and particles are constrained. For example, a closed fluidized bed system may include a pipeline (e.g., for particle transport); a recirculating fluidized bed system, such as the fluidized bed polymerization reactor system of FIG. 2 (discussed above and below); any of which may be associated with various residential, commercial and/or industrial applications.

A closed fluidized bed system may be in fluid communication with an open fluidized bed system. The fluid communication between a closed fluidized bed system and an open fluidized bed system can be isolatable, for example, using one or more valves. Such isolation valves can be configured for unidirectional fluid flow, such as for example, a pressure relief valve or a check valve. In general, the fluidized bed system (whether open or closed) can be defined by manufactured (e.g., man-made) boundaries comprising one or more barriers. The one or more barriers defining manufactured boundaries can generally be made from natural or non-natural materials. Also, in general, the fluidized bed system (whether open or closed) can be a flow system such as a continuous flow system or a semi-continuous flow (e.g., intermittent-flow) system, a batch system, or a semi-batch system (sometimes also referred to as a semi-continuous system). In many instances, fluidized bed systems that are flow systems are closed fluidized bed systems.

The fluidized bed in several embodiments may be generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc.

Fluidized beds can also be formed by vibrating or otherwise agitating the particles. The vibration or agitation keeps the particles in a fluidized state.

Fluidized Bed Polymerization Reactor Systems

In each of the aforementioned generally preferred approaches and/or embodiments, a fluidized bed system may include a fluidized bed polymerization reactor system. As briefly noted above, gas phase polymerization reactions may be carried out in fluidized bed polymerization reactors, and can also be formed in stirred or paddle-type reaction systems (e.g., stirred bed systems) which include solids in a gaseous environment. While the following discussion will feature fluidized bed systems, where the present invention has been found to be preferred and especially advantageous, it is to be understood that the general concepts relating to the generally preferred embodiments described above and elsewhere herein, which are discussed as relevant to the preferred fluidized bed systems, are also adaptable to the stirred or paddle-type reaction systems as well. The present invention is not limited to any specific type of gas phase reaction system.

For example, in very general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a cycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the cycle stream or reactor vessel, to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661, 5,668,228, and 6,689,847. A basic, conventional fluidized bed system is illustrated in FIG. 2. The reactor vessel 110 comprises a reaction zone 112 and a velocity reduction zone 114. While a reactor configuration comprising a generally cylindrical region beneath an expanded section is shown in FIG. 2, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 2.

For example, in general, the height to diameter ratio of the reaction zone can vary in the range of about 2.7:1 to about 5:1. The range may vary to larger or smaller ratios and depends mainly upon the desired production capacity. The cross-sectional area of the velocity reduction zone 114 is typically within the range of from about 2.5 to about 2.9 multiplied by the cross-sectional area of the reaction zone 112.

The reaction zone 112 includes a bed of growing polymer particles, formed polymer particles and a minor amount of catalyst all fluidized by the continuous flow of polymerizable and modifying gaseous components, including inerts, in the form of make-up feed and cycle fluid through the reaction zone. To maintain a viable fluidized bed, the superficial gas velocity through the bed must exceed the minimum flow required for fluidization which is typically from about 0.2 to about 0.5 ft/sec. for polyolefins. Preferably, the superficial gas velocity is at least 0.2 ft/sec above the minimum flow for fluidization or from about 0.4 to about 0.7 ft/sec. Ordinarily, the superficial gas velocity will not exceed 5.0 ft/sec and is usually no more than about 2.7 ft/sec. However, some embodiments may use higher superficial gas velocities.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed consisting of desired polymer particles supplants the start-up bed.

Fluidization is achieved by a high rate of fluid cycle to and through the bed, typically on the order of about 50 times the rate of feed or make-up fluid. This high rate of cycle provides the requisite superficial gas velocity necessary to maintain the fluidized bed. The fluidized bed has the general appearance of dense mass of individually moving particles as created by the percolation of gas through the bed. The pressure drop through the bed is equal to or slightly greater than the weight of the bed divided by the cross-sectional area.

Referring again to FIG. 2, make-up fluids can be fed at point 118 via cycle line 122. The composition of the cycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the cycle stream and, where desired, at least part of the make-up stream can be returned through cycle line 122 to the reactor, for example at inlet 126 below the bed. Preferably, in a class of embodiments, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the cycle stream which leaves the reaction zone 112 and passes into the velocity reduction zone 114 above the bed where a major portion of the entrained particles drop back onto the bed thereby reducing solid particle carryover.

The cycle stream is then compressed in compressor 130 and passed through heat exchanger 124 where the heat of reaction is removed from the cycle stream before it is returned to the bed. Note that the heat exchanger 124 can also be positioned before the compressor 130 or two heat exchangers may be used with one before the compressor, usually operating near the dew point, and one after the compressor.

The cycle stream exiting the heat exchange zone is then returned to the reactor at its base and thence to the fluidized bed through gas distributor plate 128. A fluid flow deflector 132 is preferably installed at the inlet 126 to the reactor vessel 110 to prevent contained polymer particles or liquid droplets from settling out and agglomerating into a solid mass and to maintain entrained or to re-entrain any particles or liquid which may settle out or become disentrained.

In this embodiment, polymer product is discharged from line 144. Although not shown, it is desirable to separate any fluid from the product and to return the fluid to the reactor vessel 110.

The polymerization catalyst may enter the reactor in solid or liquid form at a point 142 through line 148. If the catalyst requires the use of one or more cocatalysts, as is often the case, the one or more cocatalysts may be introduced separately into the reaction zone where they will react with the catalyst to form the catalytically active reaction product. However the catalyst and cocatalyst(s) may be mixed prior to their introduction into the reaction zone.

The reactor system 100 shown in FIG. 2 is particularly useful for forming polyolefins such as polyethylene, polypropylene, etc. Process conditions, raw materials, catalysts, etc. for forming various polyolefins and other reaction products are found in the references incorporated herein. Illustrative process conditions for polymerization reactions in general are listed below to provide general guidance.

The reaction vessel, for example, has an inner diameter of at least about 2 feet, and sometimes greater than about 20 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 25° C. to about 150° C., preferably from about 30° C. to about 125° C., more preferably in the range of from about 65° C. to about 110° C. for polypropylene, and more preferably in the range of from about 80° C. to about 120° C. for polyethylene.

Other gas phase processes contemplated include series or multistage polymerization processes. Also gas phase processes contemplated by the invention include those described in U.S. Pat. Nos. 5,627,242, 5,665,818 and 5,677,375, and European publications EP-A-0 794 200, EP-B1-0 649 992, EP-A-0 802 202, and EP-B-634 421 all of which are herein incorporated by reference.

In any of the embodiments described herein, the polymerization reaction system may be operated in a condensed mode, as described below.

In an embodiment, the reactor utilized in the present invention is capable of producing greater than 500 lbs of polymer per hour (227 Kg/hr) to about 300,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

In any of the embodiments described herein, the polymerization reaction system may be operated in a condensed or supercondensed mode (collectively "condensed mode"), where a condensable fluid is introduced to the process to increase the cooling capacity of the reactor system. These inert condensable fluids are typically referred to as (induced) condensing agents or ICA's. One particularly preferred condensing agent is isopentane, though others can be used. For further details of a condensed mode processes see U.S. Pat. Nos. 5,342,749 and 5,436,304 and U.S. Patent Appl. Pub No. 2005/0267268. By causing condensation of the condensing agent, more heat can be removed from the reaction system, thereby greatly increasing the polymer production rate.

Other Types of Bed Systems

Slower moving masses of particles, while considered "fluidized" for purposes of the present description, are also referred to in the art as "moving beds." Moving beds include particles in such things as mass flow bins, downcomers, etc. where solids are slowly moving through a vessel.

Stirred bed system, while considered "fluidized" for purposes of the invention, include beds stirred or otherwise agitated by a member such as a paddle or plunger rotating or moving through the bed (e.g., stirred bed reactor, blender, etc.). Other types of stirred bed systems can be formed by a rotating drum (e.g., with or without internal baffles to enhance mixing), a vessel moving in a see-saw manner, agitation including ultrasonic vibrations applied to the particles or their container, etc.

Separation Devices

In one general approach, shown in FIG. 1, a separation device 140 removes solids from a gas stream after the gas is compressed by a compressor 130. This approach has the advantage that a portion of the compressed gas can then be used to transport the separated solids to a destination, which may be a collection point, some point in an ongoing process, a transfer device, etc. In particularly preferred approaches, the solids are concentrated into stream of "dirty gas" that can be directed to the desired destination. Because the dirty gas stream is located downstream of the compressor, some of the compressed gas may be diverted to act as the transportation medium for the solids, with or without additional assistance.

Figure 7A:
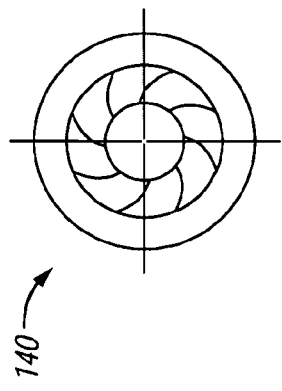
FIGS. 7A and 7B are schematic representations of apparatuses of embodiments of the invention.
Figure 7B:
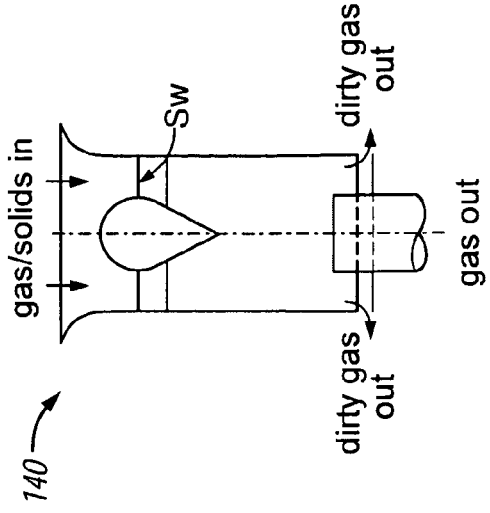
Figure 8:
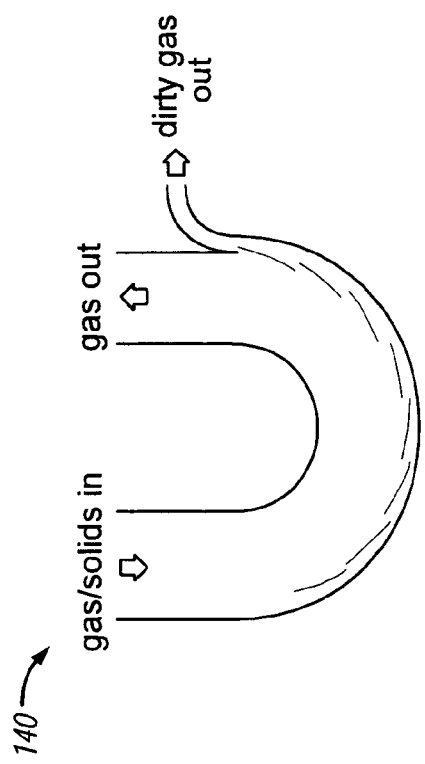
FIG. 8 is a schematic representation of an apparatus of an embodiment of the invention.

Any type of separation device 140 known in the art can be used in any of the embodiments described herein, unless otherwise noted. One approach utilizes an in-line concentrator, such as a uniflow cyclone 140 shown in FIGS. 7A-B or of the types set forth in U.S. Pat. No. 7,070,637 and U.S. Pat. No. 5,186,607, which are herein incorporated by reference. An "elbow concentrator" 140 such as that shown in FIG. 8 may also be used. A typical reverse flow cyclone, of appropriate design, could also be used. Collectors that gather the particulates can also be used. Other types of separation devices 140 are set forth below.

Where a portion of the compressed gas is used to transport the removed particulates, as much gas as is needed to effect the transportation can be used. In generally preferred approaches, less than about 40% by weight of the total gas entering the separation device is diverted to a "dirty gas" stream. In other approaches, less than about 25% of the total gas is diverted, less than about 15% is diverted, less than about 10% is diverted, and less than about 5% is diverted.

Referring again to FIG. 2 and as noted above, in a fluidized bed reactor system, the portion of the gaseous stream flowing through the fluidized bed which did not react in the bed becomes the cycle stream which leaves the reaction zone 112 and passes into the velocity reduction zone 114 above the bed where a major portion of the entrained particles, e.g., catalyst, polymer particles, etc. drop back onto the bed thereby reducing solid particle carryover. However, solid particle carryover into the cycle line 122 does occur, and may cause fouling in the various stages of the cycle line and equipment. Accordingly, it may be advantageous to remove at least some of the solid particulates from the cycle gas stream.

As shown in FIG. 2, the separation device 140 may be positioned along the cycle line 122 after the cycle gas compressor 130. The separation device 140 may act as a concentrator to concentrate the carry over particulate matter in the cycle gas, where a significant amount of the particulates can be removed with a small amount of the compressed gas and recycled independent of the main gas cycle stream. This approach is superior to prior approaches, which typically use a reverse flow cyclone at the gas outlet from the reactor, upstream of the compressor, and attempt to remove essentially all the particulates and return them to the reactor via gravity or an eductor. Return line and ejector (eductor) plugging is an issue especially when the particles are sticky, or hot, solid polymer particles. Pluggage issues are exacerbated when particulates stagnate near the pick up nozzle in the eductor.

One particularly preferred approach uses a concentrator as the separation device 140 downstream of the cycle gas compressor 130. An effluent stream of the concentrator may be fed into a reactor vessel via a secondary gas stream 162, the effluent stream being propelled by compressed gas diverted from the compressed gas stream. This approach takes advantage of the increased gas pressure for concentration of the solids and return of the solids to the reactor vessel without an eductor. Keep in mind that returning the particulates to the reactor vessel may mean that the particulates are fed directly into the reactor vessel; are fed into another stream, e.g., the cycle stream after the heat exchanger, that ultimately carries the particulates into the reactor vessel; into the product discharge system or resin purge system; etc.

Additionally, use of a concentrator will give more freedom in the design of the primary separator, the reactor dome (expanded section) as the separation efficiency may be relaxed somewhat.

In a further approach, a portion of the compressed gas is diverted from the compressed gas stream and used to transport the removed particulates, and the portion of the compressed gas and removed particles are directed at a nozzle or other portion of the reactor system. Thus, the particle recycle can be used as a flush stream, e.g., to keep a nozzle clean. A nozzle can be any point of ingress or egress for materials in the reactor system. Examples include the product discharge nozzle, return gas nozzle from the product discharge system, a catalyst input nozzle, etc. In yet another approach, a portion of the compressed gas is diverted from the compressed gas stream and used to transport the removed particulates to any other location, that may or may not be part of the reactor system. For instance, the removed particulates may be filtered from the transporting gas and gathered at a collection point, injected into the cycle line just below the reactor vessel, added to another feed line, etc.

One practicing aspects of the invention should keep in mind that presence of particulates in the cycle stream increases the risk of fouling. The greatest fouling risk begins as the gas is cooled in the heat exchanger 124 and becomes three phase flow. It has been noted that some particulates circulating in the system helps keep the system clean; however, an excess of particulates may contribute to or exacerbate issues such as fouling or cooler plugging. Therefore, when operating in a condensed mode, it may be preferable to remove the excess of particulate material that might occur from operating upsets or higher capacity operation, prior to the three phase flow area occurring in and after the heat exchanger 124 and through the distributor plate. 128. FIGS. 2 and 4 depict embodiments in which the separation device 140 is positioned upstream of the heat exchanger 124. Other embodiments may perform separation downstream of the heat exchanger 124. In yet other embodiments, the heat exchanger is coupled to the cycle line upstream of the compressor, the temperature generally kept above the dewpoint. Two heat exchangers may be used with one before the compressor, usually operating near the dew point, and one after the compressor.

In some embodiments, the solids separation may be performed by the compressor. For example, as shown in FIG. 4, the compressor 130 acts as both the cycle gas compressor 130 and separation device 140.

FIG. 5 depicts an illustrative device, an axial compressor 130, for performing compression and solids separation using a single device according to one embodiment. As shown, the illustrative axial compressor 130 includes an outer shell 502 having a first end 516, a second end 518 opposite the first end 516, an axis extending through the ends, an inlet 504 positioned towards the first end 516, a gas outlet 506 positioned towards the second end 518, a solids outlet 508 positioned towards the second end 518, an inner surface, and a plurality of arrays of stator blades 510 extending inwardly from the inner surface, a first of the arrays of stator blades being located near the inlet 504, additional of the arrays being present in spaced relation relative to each other.

The axial compressor 130 further includes an inner member 512 positioned in the outer shell 502 that is rotatably mounted relative thereto. The inner member 512 may be mounted directly to the outer shell 502, or can be independently supported. While in a typical implementation the inner member 512 will rotate relative to a stationary outer shell 502, the opposite could also be true. In a further approach, both the outer shell 502 and inner member 512 may rotate. The inner member 512 has a plurality of radial arrays of rotor blades 514 extending outwardly therefrom.

A relative rotation between the inner member 512 and the outer shell 502 compresses gas entering the inlet 504 and exiting the outlets 506, 508 by action of the arrays of stator blades 510 converting a portion of a gas velocity head generated by the arrays of rotor blades 514 into a pressure head operable to deliver the gas to a downstream array of rotor blades 514.

An appropriate discharge arrangement, similar to an in-line cyclone (uniflow cyclone) may be incorporated into the design. In a preferred approach, a barrier 520 extends inwardly from near the second end 518 of the outer shell 502. The barrier 520 separates the gas outlet 506 and the solids outlet 508 and is positioned such that a relative rotation between the inner member 512 and the outer shell 502 causes a cyclonic separation of solid particulates from a bulk of the gas. The barrier 520 directs the separated solids towards the solids outlet 508 and a majority of the gas towards the gas outlet 506. Particularly, the swirling of the gas through the last array or arrays of vanes of compressor 130 causes the solids to move towards the inner surface of the outer shell 502 by centrifugal force. Near the outlets, the gas near the inner surface of the outer shell 502, which contains a concentrated distribution of particles, is skimmed off by the barrier 520 and led to the solids outlet 508. The gas near the center, which now has relatively few particles, continues on to the gas outlet 506. Thus, in one approach, the axial compressor of FIG. 5 functions as a concentrator. Again, the "dirty gas" stream exiting the solids outlet 508 may be directed to any desired destination.

To prevent re-entrainment of the solids into the bulk of the gas, arrays of rotor blades 514 and/or arrays of stator blades 510 may be absent in an immediate vicinity of the solids outlet 508. As shown in FIG. 5, no stator or rotor blades are present in the immediate vicinity of the solids outlet 508.

As shown in FIG. 5, the inner member 512 may have a reduced diameter towards an end thereof to accommodate the barrier 520. The barrier 520 may be an axial cylinder inserted to collect the solids centrifugally concentrated near the outside of the housing.

Additional components of the axial compressor 130 of FIG. 5 may be of similar or identical to those found in known axial compressors. Thus, the control mechanisms, motor or other drive mechanism, bearings, seals, etc. may be of standard design and so will not be discussed further.

In one approach, the blades 510, 514 are forged, cast, or machined from alloy steel, or other appropriate material, to aerodynamic shapes and are spaced in rows between which the rotor blades move. The stator blades 510 and/or rotor blades 514 may be adjustable. The adjustment may be manual or automatic using any known method or mechanism. Any stator blade adjustment may be applied to one or more arrays of stator blades.

In one approach, the last array or few arrays of stator and/or rotor blades are angled to promote solids separation. The last array or arrays of stator blades may be adjustable 524, either manually or automatically, to optimize the cyclonic rotation (particle separation) and the power consumption of the combined compressor/concentrator.

One or more inlet guide vane arrays 522 may be positioned towards the inlet 504. The angle of the inlet vanes 522 and/or some stator blades 510 may be adjustable for compressor control. Such adjustment may include changing the blade or vane angle of a single guide vane, changing the blade or vane angle of a single row (set) of guide vanes, or changing the blade or vane angle of multiple rows (sets) of guide vanes.

Note that in various approaches, the solids outlet may be positioned anywhere along the length of the outer shell. In generally preferred approaches, the solids and gas outlets are positioned towards an end of the outer shell, as the pressure is typically greatest there. In other approaches, the solids outlet may be positioned towards a middle of the outer shell.

The axial compressor may be the sole compressor in a given system, e.g., as shown in FIG. 4, or may be present in addition to another compressor.

This embodiment allow s for a single piece of equipment instead of a compressor and a separate solids separation device. The energy and rotation already created in the compressor would allow for efficiency greater than with separate equipment.

Another preferred general embodiment, which may be described for example with reference to FIGS. 2 and 6, comprises a concentrator 140 with modifiable pressure drop and a detection device 640 for detecting an amount of solids in a gas. Referring to FIG. 6, an illustrative concentrator 140 includes a shell 602 having an inlet 604, a gas outlet 606, and a solids outlet 608. At least one guide vane 610 is positioned near the inlet 604 for prespinning a gas entering the shell 602, an amount of solids separated from the gas being a function of an angle of the at least one guide vane 610 relative to a direction of entry of the gas into the inlet 604. This device imparts a swirling motion to the entering gas stream by means of the guide vanes 610. The gas has both axial and tangential components of velocity in flowing through the device. The tangential velocity causes the separation, while the axial component ensures that the gas will flow through the device and exit at the other end. In one preferred approach, the gas will execute several complete turns in traversing the length of the separation section. At the exit, the gas near the outer wall of the tube, which contains a concentrated distribution of particles, is skimmed off and led to the dust exit. The gas near the center, which now has relatively few particles, continues on into the cleaned gas outlet.

Illustrative without limitation detection devices 640 include those using acoustic emissions, energy absorbance, and other appropriate means capable of measuring the relative amount of solids within the flow stream. In a fluidized bed reactor system, for example, the detection device 640 may be used to measure the relative amount of solids being carried over from the reactor into the cycle gas. This measurement can then be used to automatically increase or decrease the vane angle to provide an optimization of the degree of solids separation and power consumption (pressure drop). Such optimization provides for operation of the cycle gas system at the minimum compressor power necessary for the particular operating conditions.

In use, the blade angle of the at least one guide vane 610 is adjusted based on a reading from the detection device 640 or combination of signals from multiple detection devices 640 in different locations. Such adjustment may include changing the blade or vane angle of a single guide vane, changing the blade or vane angle of a single row (set) of guide vanes, or changing the blade or vane angle of multiple rows (sets) of guide vanes. For example, an amount of solids in a gas stream may be detected using the detection device 640 continuously, periodically, randomly, etc. If the detected amount of solids in the gas stream decreases, e.g., below a threshold, relative to a prior reading, etc., an angle of a guide vane of the concentrator is decreased relative to a direction of entry of the gas into the concentrator. This induces less spin of the gas passing through the concentrator 140, thereby decreasing separation efficiency but also decreasing the overall pressure drop across the concentrator 140. Thus, when the solids concentration in the gas is minimal, e.g., the carry over from the reactor vessel 110 into the cycle gas stream is minimal and not causing problems with cooler or distributor plate fouling, the vane angle can be adjusted to minimize the pressure drop and power consumption.

If, on the other hand, the detected amount of solids in the gas stream increases, e.g., above a threshold, relative to a prior reading, etc., the angle of the one or more guide vanes relative to the direction of entry of the gas into the concentrator can be increased. This induces more spin of the gas passing through the concentrator 140, thereby improving separation but increasing the overall pressure drop across the concentrator 140. Thus, when the solids concentration increases due to operating conditions, upset conditions, or for products with greater sensitivity, the vane angle can be increased to give greater solids concentration and removal, e.g., for recycle directly to the reactor vessel, or transport to other desired location.

To maintain about a constant mass flow rate after adjustment of the vane angle, the power applied to the compressor may be increased or decreased. The control systems for monitoring and maintaining about a constant mass flow rate are well known.

The concentrator design may resemble conventional uniflow concentrators, axial concentrators, cyclone concentrators, etc.

In one approach, the amount of solids is detected upstream of the concentrator. For example, as shown in FIG. 2 a detection device 640-1 and or 640-2 may be positioned, or have a sensor located, on the cycle line 122 between the reactor vessel 110 and the separation device 140.

In another approach, the amount of solids is detected downstream of the concentrator. For example, as shown in FIGS. 2 and 4, the detection device 640-3, 640-4 may be positioned, or have a sensor located, on the cycle line 122 downstream of the separation device 140.

In another approach, the amount of solids is detected downstream of the concentrator in the concentrated stream line 162. For example, as shown in FIGS. 2 and 4, the detection device 640-5 may be positioned, or have a sensor located, on the concentrated solids line downstream of the separation device 140. In one embodiment, the detection of an increased amount of solids at one of the upstream sensors (640-1 or 640-2 for example) may cause the vane angle to be increased to increase the solids removal effect. Thereafter, a subsequent drop in the solids measurement in the concentrated line 162 (as measured by detection device 640-5 for example) may provide an indication that the period of excessive solids carry-over has passed and the vane angle may be decreased to a lower pressure-drop setting.

Fluids

In general, for example, separation devices can be used in connection with liquids and/or gasses having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.0005 g/cc to about 20 g/cc and/or can have a dielectric constant ranging from about 1 to about 100. In many embodiments of the invention, the bulk material is a gaseous fluid. Gaseous fluids can, for example, generally have viscosities ranging from about 0.001 to about 0.1 cP, and/or can have densities ranging from about 0.0005 to about 0.1 g/cc and/or can have a dielectric constant ranging from about 1 to about 1.1.

The bulk material can include relatively pure gaseous elements (e.g., gaseous $N_2$, gaseous $O_2$) and a relatively pure liquid. Other components can include other liquids and mixtures, solid, or gaseous compounds (e.g., liquid or solid catalyst, gaseous monomer, air). The various aspects of the invention can also operate in conjunction with single-phase or multi-phase mixtures of gases, solids and/or liquids, including for example: two-phase mixtures of solids and gases (e.g., fluidized bed systems), mixtures of gasses with a single type of particle, mixtures of gasses with different types of particles (e.g., polymer and catalyst particles); and/or three-phase mixtures of gasses, liquids and solids (e.g., fluidized bed with liquid catalyst being added).

While general operating conditions have been provided above, in addition to those listed above, process conditions may vary as understood in the art, such as temperature, pressure, fluid flowrate, etc.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities and variances normally associated with the elements and materials used For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for separating particulates from a cycle gas stream of a fluidized bed polymerization reactor system comprising:
   compressing a cycle gas stream coming directly from a reactor, the cycle gas stream having particulates entrained therein;
   detecting an amount of solids in said cycle gas stream using a detection device;
   removing at least some of the particulates from the compressed gas stream, wherein the removing is performed by a concentrator, wherein the concentrator comprises a shell having an inlet, a gas outlet, and a solids outlet, and at least one guide vane positioned near the inlet, and wherein the blade angle of the at least one guide vane is adjusted based on a reading from the detection device; and
   feeding the removed particulates into a reactor vessel of the reactor system.

2. The method of claim 1, wherein a portion of the compressed gas is diverted from the compressed gas stream and used to feed the removed particulates into the reactor vessel.

3. The method of claim 1, wherein a solids effluent stream of the concentrator is fed into a reactor vessel of the reactor system, the effluent stream being propelled by compressed gas diverted from the compressed gas stream.

4. The method of claim 1, wherein a portion of the compressed gas is diverted from the compressed gas stream and used to transport the removed particulates, wherein the portion of the compressed gas and removed particles are directed at a nozzle of the reactor system.

5. The method of claim 1, wherein a portion of the compressed gas is diverted from the compressed gas stream and used to convey the removed particulates to another location.

6. A method according to claim 1 for separating particulates from a gas stream in a fluidized bed reactor system comprising:
   compressing a cycle gas stream coming directly from a reactor vessel, the cycle gas stream having particulates entrained therein;
   using a concentrator to concentrate at least some of the particulates in the compressed cycle gas stream in a second gas stream, the second gas stream comprising gas diverted from the compressed cycle gas stream; and
   directing the second gas stream into the reactor vessel.

7. A fluidized bed polymerization reactor system comprising:
   at least one fluidized bed polymerization reactor vessel;
   a cycle line for cycling gas removed from the at least one reactor vessel back to the at least one reactor vessel;
   a detection device for detecting an amount of solids in said cycle line;
   a compressor for compressing the gas in the cycle line;
   a separation device for removing particulates from the compressed gas, wherein the separation device is a concentrator, wherein the concentrator comprises a shell having an inlet, a gas outlet, and a solids outlet, and at least one guide vane positioned near the inlet, and wherein the blade angle of the at least one guide vane is adjusted based on a reading from the detection device; and
   means for feeding the removed particulates to the reactor vessel.

8. The reactor system of claim 7, further comprising a heat exchanger for cooling the compressed gas, wherein the heat exchanger is coupled to the cycle line between the compressor and the separation device, or downstream of the separation device, or upstream of the compressor.

9. The reactor system of claim 7, wherein a portion of the compressed gas is diverted from the cycle line and used to feed the removed particulates into the reactor vessel.

10. The reactor system of claim 7, wherein an effluent stream of the concentrator is fed into the reactor vessel of the reactor system, the effluent stream being propelled by a portion of the compressed gas diverted from the cycle line.

11. The reactor system of claim 7, wherein a portion of the compressed gas is diverted from the compressed cycle gas stream and used to transport the removed particulates, wherein the portion of the compressed gas and removed particles are directed at a nozzle of the reactor system.

12. The reactor system of claim 7, wherein a portion of the compressed gas is diverted from the cycle line and used to convey the removed particulates to another location away from the separation device.

* * * * *